US012481497B2

(12) United States Patent
Deshpande et al.

(10) Patent No.: US 12,481,497 B2
(45) Date of Patent: Nov. 25, 2025

(54) METHOD AND SYSTEM FOR BUILDING AND LEVERAGING A KNOWLEDGE FABRIC TO IMPROVE SOFTWARE DELIVERY LIFECYCLE (SDLC) PRODUCTIVITY

(71) Applicant: LTI Mindtree Ltd, Mumbai (IN)

(72) Inventors: Nachiket Deshpande, Mumbai (IN); Aarya Karambelkar, Mumbai (IN); Adish Apte, Mumbai (IN); Arindam Bhattacharya, Mumbai (IN); Brijesh Prabhakar, Mumbai (IN); Devanathan Desikan, Plano, TX (US); Meena Malu, Mumbai (IN); Sandeep Deb, Mumbai (IN)

(73) Assignee: LTI Mindtree Ltd, Mumbai (IN)

( * ) Notice: Subject to any disclaimer, the term of this patent is extended or adjusted under 35 U.S.C. 154(b) by 198 days.

(21) Appl. No.: 17/949,211

(22) Filed: Sep. 21, 2022

(65) Prior Publication Data
US 2024/0028327 A1   Jan. 25, 2024

(30) Foreign Application Priority Data
Jul. 20, 2022   (IN) .............................. 202221041505

(51) Int. Cl.
*G06F 8/70* (2018.01)
*G06F 16/36* (2019.01)
*G06N 5/022* (2023.01)
(52) U.S. Cl.
CPC .............. *G06F 8/70* (2013.01); *G06F 16/367* (2019.01); *G06N 5/022* (2013.01)

(58) Field of Classification Search
CPC .......... G06F 8/70; G06F 16/367; G06N 5/022
USPC ......................................................... 717/104
See application file for complete search history.

(56) References Cited

U.S. PATENT DOCUMENTS

| | | | |
|---|---|---|---|
| 9,824,128 B1 * | 11/2017 | Maluf | G06F 16/248 |
| 10,534,585 B1 * | 1/2020 | Eberlein | G06N 5/04 |
| 10,607,598 B1 * | 3/2020 | Larson | G10L 15/07 |
| 2011/0296378 A1 * | 12/2011 | Chiang | G06F 8/71 717/113 |
| 2020/0057946 A1 * | 2/2020 | Singaraju | G06N 5/022 |
| 2020/0134757 A1 * | 4/2020 | Raphael | G06F 16/9024 |
| 2020/0233782 A1 * | 7/2020 | Venkataraman | G06F 11/3688 |
| 2020/0322218 A1 * | 10/2020 | Anwer | H04L 41/16 |
| 2021/0191696 A1 * | 6/2021 | Ibarra Von Borstel | G06F 8/36 |

(Continued)

*Primary Examiner* — Bradford F Wheaton
(74) *Attorney, Agent, or Firm* — CHIP LAW GROUP

(57) ABSTRACT

Provided is a method and system (108) for building and leveraging a knowledge fabric (110) in a Software Development Lifecycle (SDLC). A plurality of SDLC artifacts are received from a plurality of heterogeneous data sources (102). The plurality of SDLC artifacts are then correlated to build an end-to-end correlation and are clustered to generate an SDLC knowledge fabric (110). This includes extracting semantic and contextual data from the plurality of SDLC artifacts using Natural Language Processing (NLP) and deep text analytics and transforming the extracted semantic and contextual data to knowledge graphs. One or more actionable items (112) are then derived using the SDLC knowledge fabric (110) and the one or more actionable items (112) are used to improve overall process efficiency and accelerate software delivery in the SDLC.

14 Claims, 6 Drawing Sheets

(56) References Cited

U.S. PATENT DOCUMENTS

2022/0215175 A1\* 7/2022 Li .......................... G06F 40/30
2022/0360494 A1\* 11/2022 Chunduru Venkata ......................
 H04L 67/51
2024/0013123 A1\* 1/2024 Latha ............... G06Q 10/06313

\* cited by examiner

METHOD AND SYSTEM FOR BUILDING AND LEVERAGING A KNOWLEDGE FABRIC TO IMPROVE SOFTWARE DELIVERY LIFECYCLE (SDLC) PRODUCTIVITY

TECHNICAL FIELD OF THE INVENTION

The present invention generally relates to Software Delivery Lifecycle (SDLC). More particularly, the invention relates to a method and system to improve software delivery productivity in an SDLC through insights extracted by leveraging Artificial Intelligence (AI), Machine Learning (ML), Natural Language Processing (NLP), and clustering algorithms.

BACKGROUND OF THE INVENTION

Artificial intelligence ("AI") and machine learning ("ML") are powering data-driven advances that are transforming industries worldwide. Enterprises and businesses are advancing to leverage AI and ML as a competitive advantage to deliver innovation ranging from the development of new therapies in life sciences to risk management in financial services to the personalization of online customer experiences.

Organizations may procure custom AI solutions and implementations from specialized software developers. In both situations, scientists, engineers, and analysts creating AI applications use a combination of software libraries, tools, point solutions, distributed systems, as well as AI and IT infrastructures, generally assembled piecemeal to craft a complete solution for the product development lifecycle. The assembly, installation, and management of such applications are challenging and usually are performed either manually or by writing customized scripts. Thus, integrating different heterogeneous technologies increases the overall complexity of implementing such applications. In addition, script-centric technologies often depend on the underlying infrastructure such as operating systems, leading to problems with provisioning logic across different networks and computing infrastructures and portability of applications. Often missing is the project control that comes from a single, integrated view of enterprise-wide AI development. The diversity of tools and specialized algorithms spanning multiple technological specialties results in a lack of broad systems support and optimization methods across a Software Development Lifecycle (SDLC).

SDLC process is a process for planning, creating, testing, and deploying an information system or software asset throughout the life cycle of the software asset. SDLC comprises the investigation, analysis, design, implementation, and maintenance of a software asset.

Development of new software often involves incorporating existing code, libraries, and existing network architecture, each of which comes with its own set of vulnerabilities, some of which are known and others which are unknown or not yet identified. With the ever-changing electronic security landscape, the software requires constant updating to reduce security risks and prevent breaches. With software integration to a plurality of internal and external resources, identification of requirements for the duration of the software lifecycle is an onerous task and keeping abreast of requirements, vulnerabilities, updates, and breaches can also be onerous during the software development and maintenance lifecycle.

Software analysts, developers, and testers can be overwhelmed with the amount of available information and variety of tools they can employ, be required to consider long lists of task requirements, guidelines, and standards, and be required to provide tangible and auditable evidence that software products comply with requirements. Externally linked libraries, resources, and scripts incorporated into a software asset can also be dynamic and automatically distributed such that updates and breaches may not be immediately brought to the attention of developers. Human error in the inadvertent omission of a requirement or an insufficient verification can also introduce vulnerabilities into the software asset.

Despite known software vulnerabilities being public knowledge to both developers and hackers, software developers often lack relevant, timely, and context specific tools and guidance to help them build and maintain secure software. Many tools focus only on detecting particular vulnerabilities in the source code of a piece of software and are designed to analyze source code and/or compiled versions of code to help find security flaws. However, fixing a vulnerability after coding is costly and often difficult, and identification and prioritization of tasks from externally sourced resources can be challenging to developers. Large repositories of security and regulatory information can be difficult to navigate, are not tailored to a specific application environment, and are often not subject to commercial-grade quality controls. Having multiple large and evolving repositories of requirements also requires developers to identify any requirements about a particular application, and to keep up to date with new information and requirements.

Various ML algorithms that execute as pipelines ingest data and perform computational tasks, wherein the pipelines may run on engines. An ML manual pipeline process is a convenient and frequently used tool in the study of use cases. The process is driven based on a script, and each step is manual, including data analysis, data preparation, data transformation, model training, and data validation.

The script-driven process selection depends on how ML models are changed or trained over time and their complexities. A data scientist is commonly challenged with a large number of choices where informed decisions need to be taken. For example, the data scientist needs to select among a wide range of possible algorithms including classification or regression techniques (e.g., Support Vector Machines, Neural Networks, Bayesian Models, Decision Trees, etc.) and the tuning of numerous hyper-parameters of the selected algorithm. This method may likely produce unexpected results due to various constraints, dependency on data collection, preparation-preprocessing, model training, validation, and testing.

In addition, the development-test environment is different from the staging-production environment, and ML manual process models often fail to adapt to rapidly evolving user requirements, changes in the dynamics of the production environment, or changes in the data describing the production environment. Thus, efficient pipelines and infrastructures are required for data-streaming which eliminates high operational costs and prevent delays that directly or indirectly affect the quality and product's commercial potential.

In addition to the aforementioned issues, the existing art also fails to showcase the confluence of knowledge fabric, which is an integration of technologies such as AI, ML, Natural Language Processing (NLP), semantic knowledge graph, telemetry software, with growing Software Delivery Life Cycle (SDLC) data (volume, variety, velocity), to deliver the disruptive capability of SDLC Knowledge Fabric & AI-assisted software delivery productivity.

Some of the existing SDLC tools automate the process of that lifecycle phase, for e.g. requirements or testing or defects or code file version control, but do not leverage the data they have gathered for further investigation with AI techniques. Some of the existing software quality assessment tools leverage only specific functional data points like test management to generate test impact analytics and quality risks using AI techniques. The existing software quality assessment tools focus only on the requirements function alone, leveraging AI techniques for analyzing requirements, automating requirements quality testing, and enabling automated estimation. The leverage of AI technologies in the market is widely focused on code generation and assisted automation. On other hand, value stream management tools enable connectivity across various DevOps tools to take away the friction in the movement of data and thereby enabling value stream delivery. However, these tools do not derive any further insights from this raw data.

There are several other whitespaces in SDLC from planning & estimation, collaboration, application development, software testing, defect management, resilience engineering, etc. that can potentially apply AI techniques on SDLC digital assets to derive insights for answering "What", "Why", "Who" and "Where" questions and help optimize, drive faster decision making and hence accelerating the lifecycle.

The evolution of NLP algorithms such as, for example, transformer models, and the growth and maturity of graph database, has given rise to and enabled AI-assisted software delivery with high accuracy and impact.

Accordingly, IT at enterprises and companies have introduced and implemented automation, cloud architecture, and new ways of working to help improve software developer productivity. Despite the improvement, developer velocity Key Performance Indicator (KPI) is becoming weak. AI-assisted development is emerging as a novel technique built on the underlying SDLC data and the SOTA NLP techniques to provide insights that call for more effective decisions early in the SDLC.

The need exists, therefore, in solving the whitespaces across SDLC by building an end-to-end correlation and clustering data entities, and delivering insight-fueled acceleration to improve software delivery productivity through insights extracted by AI/ML/NLP & ontology engineering.

SUMMARY OF THE INVENTION

The invention discusses a method and system for improving software delivery productivity in a Software Development Lifecycle (SDLC) through insights extracted by leveraging Artificial Intelligence (AI), Machine Learning (ML), Natural Language Processing (NLP), and clustering algorithms.

One or more shortcomings of the prior art are overcome, and additional advantages are provided through the invention. Additional features are realized through the techniques of the invention. Other embodiments and aspects of the disclosure are described in detail herein and are considered a part of the invention.

BRIEF DESCRIPTION OF FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1:
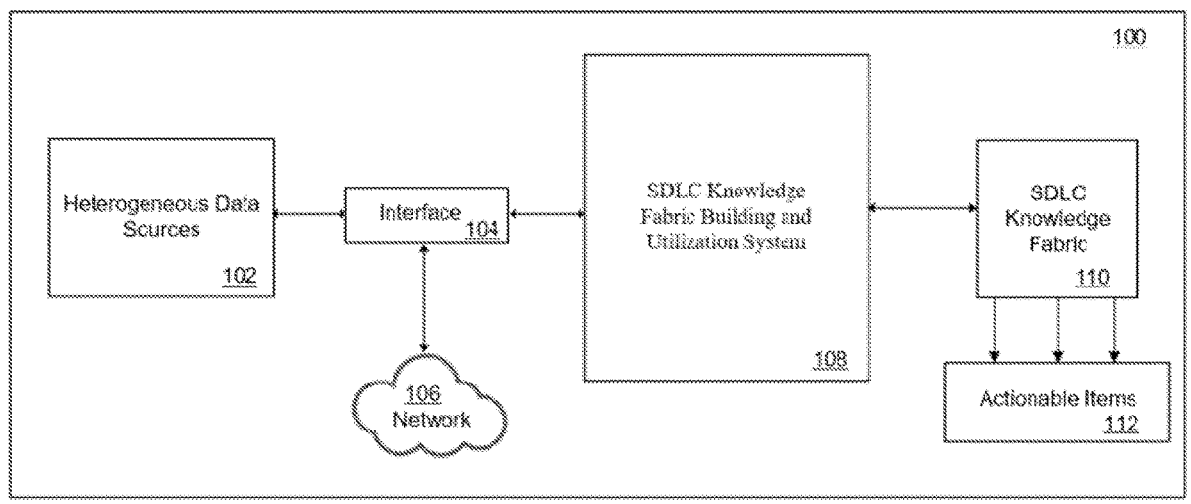
FIG. 1 illustrates a block diagram of a Software Development Lifecycle (SDLC) system in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present invention.

DETAILED DESCRIPTION OF THE INVENTION

Before describing in detail embodiments that are in accordance with the invention, it should be observed that the embodiments reside primarily in combinations of method steps and system components to improve software delivery productivity in a Software Development Lifecycle (SDLC) through insights extracted by leveraging Artificial Intelligence (AI), Machine Learning (ML), Natural Language Processing (NLP), and clustering algorithms.

Various embodiments of the invention disclose a method and system for delivering AI insights based solutions to improve SDLC productivity. The present invention facilitates receiving varied and voluminous data such as, but not limited to, user stories, test cases, defects, incidents, code files, databases, defect logs and other logs that are generated from the SDLC and uniquely apply AI/ML/NLP and clustering algorithms to build an end-to-end correlation across the SDLC assets to create a Knowledge Fabric (KF) to derive insights that help provide various software delivery personals with improved decision making to help improve the software delivery productivity.

A plurality of SDLC artifacts are received from a plurality of heterogeneous data sources. The plurality of heterogeneous data sources may include but are not limited to, requirements, time-series data, user stories, test cases, code files (comments), databases, defect logs, and other logs. The plurality of heterogeneous data sources may include but are not limited to, structured databases, semi-structured documents, and unstructured documents.

The plurality of SDLC artifacts are then correlated and clustered to generate a knowledge fabric. According to an aspect of the invention, the correlating and clustering include extracting, semantic and contextual data from the plurality of SDLC artifacts using NLP and deep text analytics and transforming the extracted semantic and contextual data into one or more knowledge graphs. In an instance, audio corresponding to one or more SDLC artifacts is translated to text using a speech recognition model and using text summarization, a change request summary is created. The speech recognition model can be either a pretrained fine-tuned transformers-based model Wav2Vec2 or a trained DeepSpeech model.

In some implementations, an NLP-based search engine on a transformers-based architecture is constructed to handle sequential data such as, but not limited to, natural language, and tasks including translation and text summarization.

One or more actionable items are then derived using the knowledge fabric. The one or more actionable items are utilized to improve the overall process efficiency of the SDLC. The one or more actionable items may include, but are not limited to, contextual search results based on one or more queries, AI-derived actionable insights, situational intelligence data, root cause analysis (RCA), and impact analysis.

The use of the knowledge fabric for deriving actionable items is further described in accordance with various embodiments of the invention.

In accordance with an embodiment, check-ins and check-outs are captured in version control systems to identify details of software code developed. Further, lines-of-code (LOC) productivity are refined, using NLP correlations and the knowledge fabric, with quality in terms of defects associated with the software code. Based on this, a nuanced analysis may be provided on the productivity of the software code developed in terms of function points and technical debt to introduce a new change request.

In accordance with another embodiment, data on past releases, and dependencies between user stories are identified using the knowledge fabric and graph embeddings. The data and the dependencies identified are then combined with software developer productivity. Inputs may then be provided, on one or more productivity metrics related to change impact analysis of one or more application components using one or more machine learning algorithms. The one or more application components may include, but are not limited to, user stories, test cases, defects screens, databases, share components, and code modules.

Furthermore, according to an aspect of the invention, when there is a new change requirement, upstream and downstream dependencies and cross-application and product impact, system impact, and impacted requirements are assessed. These may include, but are not limited to, impact on quality, functional and performance hotspot, impacted test cases or test scenarios, impact to regression, automation script impact, and impact to test data repositories.

In accordance with yet another embodiment, time-series data is identified from one or more application performance management tools, using the knowledge fabric. The time-series data along with the business transaction, under investigation, correlation to code files may then be combined with Chaos engineering. Using this data, performance issues and bottlenecks may be highlighted in one or more infrastructure resources in the SDLC. The one or more infrastructure resources may include, but are not limited to, CPU utilization, memory usage, network latency, and input/output (I/O) constraints.

In accordance with still yet another embodiment, code, code translation, and code defect prediction may be automatically generated using the knowledge fabric, by a fine-tuned transformer model, to reduce the coding efforts of a software developer.

Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequences of instructions designed for execution on a computer system.

Various embodiments of the invention disclose an artificial intelligence platform that utilizes artificial intelligence to improve the productivity of SDLC. For an instance, the artificial intelligence platform may receive data associated with SDLC and may correlate the data associated with the SDLC to generate correlated data. The artificial intelligence platform may train an AI model, a deep neural network model, and/or an ML model. The artificial intelligence platform may process the data identifying new software requirements or the defect and may process data identifying the file or the module impacted by the new software requirement or the defect. The artificial intelligence platform may process the data identifying the defect, identify duplicates of the defect and a correction to the defect, and may perform one or more actions based on data identifying the file or the module impacted by the new software requirement or the defect, the developer to handle the new software requirement or the defect.

In this way, productivity may be improved for SDLC that includes tools for software coding, software building, software testing, software packaging, software releasing, software configuring, and/or software monitoring. This, in turn, conserves computing resources (e.g., processing resources, memory resources, and/or the like), networking resources, and/or the like that would otherwise be wasted inefficiently utilizing such tools, selecting software developers to handle new software requirements and/or defects, identifying corrections for defects, and/or like.

FIG. 1 is a block diagram of a Software Development Lifecycle (SDLC) system in which systems and/or methods described herein may be implemented in accordance with an exemplary embodiment of the invention. Referring to FIG. 1, there is shown an SDCL system 100 that includes a plurality of heterogeneous data sources 102, an interface 104, a network 106, an SDLC knowledge fabric building and utilization system 108, an SDLC knowledge fabric 110, and one or more actionable items 112.

The plurality of heterogeneous data sources 102 may include, but are not limited to, unstructured documents (for example, word, pdf), semi-structured documents (for example, JSON, XML), and structured databases (for example, relational databases).

The interface 104 may be used by a computer for communicating with another computing system (whether illustrated or not) that is communicatively linked to the network 106 in a distributed environment.

Network 106 includes communication networks operable to facilitate communication, either wirelessly or wired. Any of the communications networks may include, but are not limited to, any one of a combination of different types of suitable communications networks such as, for example, broadcasting networks, cable networks, public networks (for example, the Internet), private networks, wireless networks, cellular networks, or any other suitable private and/or public networks. Further, any of the communications networks may have any suitable communication range associated therewith and may include, for example, global networks (for example, the Internet), metropolitan area networks (MANs), wide area networks (WANs), local area networks (LANs), or personal area networks (PANs). In addition, any of the communications networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Generally, the interface 104 is operable to communicate with the network 106 and may include logic encoded in software, hardware, or a combination of software and hardware. More specifically, the interface 104 may include software supporting one or more communication protocols associated with communications such that the network 106 is operable to communicate physical signals within and outside of the SDLC system 100.

The SDLC knowledge fabric building and utilization system 108 may comprise suitable logic, circuitry, interfaces and/or code that may be configured to construct the SDLC knowledge fabric 110 and derive one or more actionable items 112 using the SDLC knowledge fabric 110. In operation, the SDLC knowledge fabric building and utilization system 108 receives a plurality of SDLC artifacts from the plurality of heterogeneous data sources 102 via the interface 104 over the network 106.

The SDLC knowledge fabric building and utilization system 108 correlates and clusters the plurality of SDLC artifacts received from the plurality of heterogeneous data sources 102 to generate the SDLC knowledge fabric 110. To generate the SDLC knowledge fabric 110, the SDLC knowledge fabric building and utilization system 108 extracts semantic and contextual data from the plurality of SDLC artifacts using NLP and deep text analytics and transforms the extracted semantic and contextual data into one or more knowledge graphs. In an embodiment, the extracted text is converted to knowledge graphs using NLP (for instance, named entity extraction and information extraction)—to build robust knowledge organization systems or ontologies that may include, but are not limited to, Resource Description Framework (RDF) triples, semantic web and labeled property graphs; which can be queried by SPARQL and other query languages.

The SDLC knowledge fabric building and utilization system 108 is further configured to derive the one or more actionable items 112 using the SDLC knowledge fabric 110, and the one or more actionable items 112 are utilized to improve the overall process efficiency of the SDLC. For instance, the one or more actionable items 112 may be used to provide situational intelligence, contextual and semantic search and insights, and impact analysis.

Figure 2:
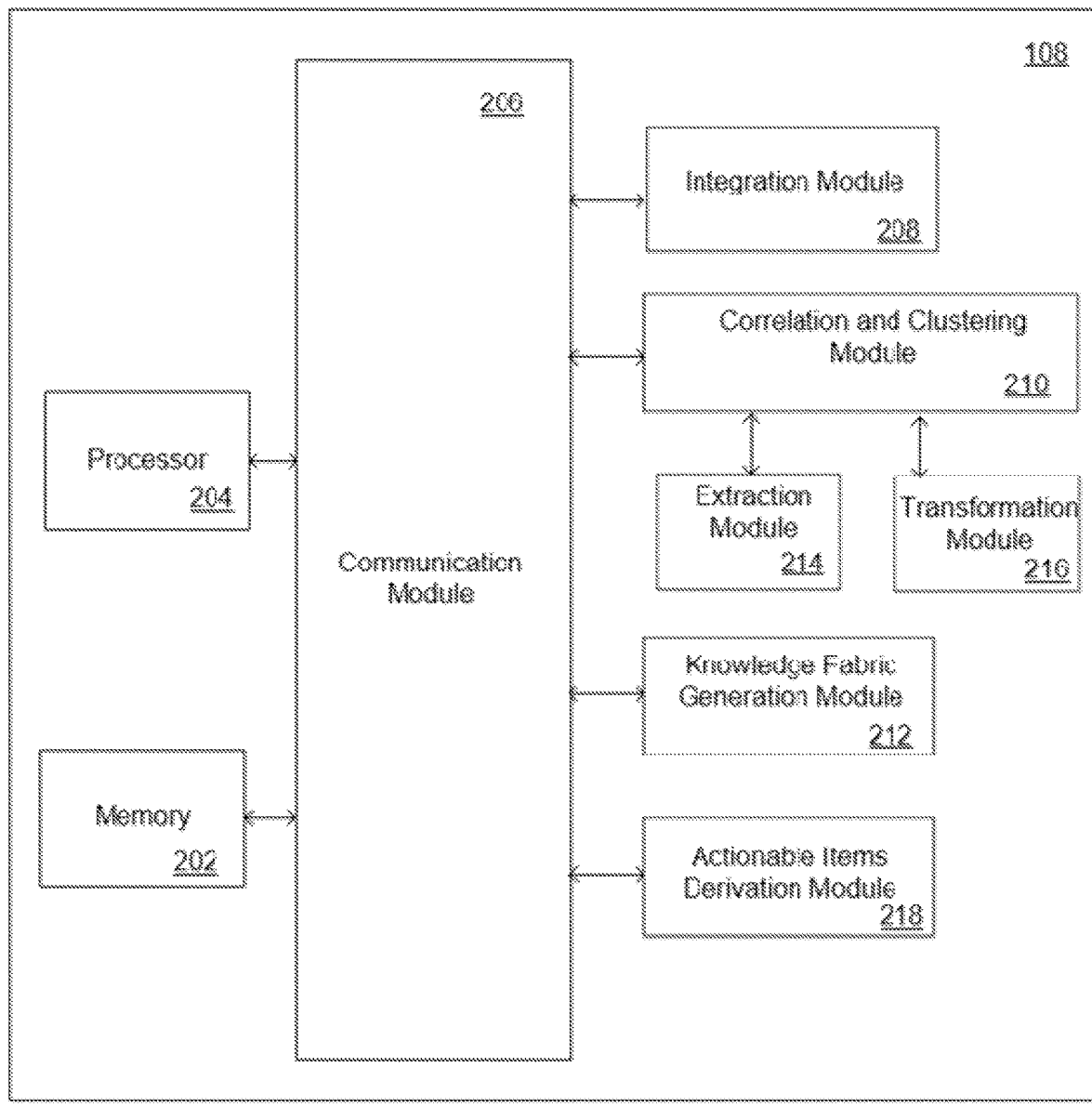
FIG. 2 illustrates a SDLC knowledge fabric building and utilization system in accordance with an embodiment of the invention.

FIG. 2 is a diagram that illustrates an SDLC knowledge fabric building and utilization system 108 in accordance with an exemplary embodiment of the invention.

As illustrated in FIG. 2, the SDLC knowledge fabric building and utilization system 108 includes a memory 202 and a processor 204, a communication module 206, an integration module 208, a correlation and clustering module 210, a knowledge fabric generation module 212, an extraction module 214, a transformation module 216 and an actionable items derivation module 218.

The memory 202 may comprise suitable logic, and/or interfaces, that may be configured to store instructions (for example, computer-readable program code) that can implement various aspects of the present invention.

The processor 204 may comprise suitable logic, interfaces, and/or code that may be configured to execute the instructions stored in the memory 202 to implement various functionalities of the SDLC knowledge fabric building and utilization system 108 in accordance with various aspects of the present invention. The processor 204 may be further configured to communicate with various modules of the SDLC knowledge fabric building and utilization system 108 via the communication module 206.

The communication module 206 comprises suitable logic, interfaces, and/or code that may be configured to transmit data between modules, engines, databases, memories, and other components of the SDLC knowledge fabric building and utilization system 108 for use in performing functions discussed herein. The communication module 206 may include one or more communication types and utilizes various communication methods for communication within the SDLC knowledge fabric building and utilization system 108.

The integration module 208 may comprise suitable logic, interfaces, and/or code that may be configured to receive a plurality of SDLC artifacts from the plurality of heterogeneous data sources 102. The plurality of SDLC artifacts may include, but are not limited to, requirements, time-series data, user stories, test cases, code files (comments), databases, defect logs, and other logs. The plurality of heterogeneous data sources 102 may include, but are not limited to, unstructured documents, structured databases, and semi-structured documents.

The correlation and clustering module 210 may comprise suitable logic, interfaces, and/or code that may be configured to build the SDLC knowledge fabric 110 by correlating and clustering the various SDLC artifacts received from the plurality of heterogeneous data sources 102.

The correlation and clustering module 210 is coupled to the knowledge fabric generation module 212 that may comprise suitable logic, interfaces, and/or code that may be configured to build the SDLC knowledge fabric 110.

The correlation and clustering module 210 may further include the extraction module 214 and the transformation module 216.

The extraction module 214 may comprise suitable logic, interfaces, and/or code that may be configured to extract semantic and contextual data from the plurality of SDLC artifacts using Natural Language Processing (NLP) and deep text analytics.

In an embodiment, the extraction module 214 is configured to translate, using a speech recognition model, audio corresponding to one or more SDLC artifacts to text and create, using text summarization, a change request summary. The speech recognition model can be either a pretrained fine-tuned transformers-based model Wav2Vec2 or a trained DeepSpeech model.

In another embodiment, an NLP-based search engine on a transformers-based architecture is constructed to handle sequential data including, but not limited to, natural language, and tasks including translation and text summarization.

The transformation module 216 may comprise suitable logic, interfaces, and/or code that may be configured to transform the extracted semantic and contextual data into one or more knowledge graphs.

The actionable items derivation module 218 may comprise suitable logic, interfaces, and/or code that may be configured to derive the one or more actionable items using the SDLC knowledge fabric 110. The one or more actionable items 112 may include, but are not limited to, contextual search results based on one or more queries, AI-derived actionable insights, situational intelligence data, root cause analysis (RCA), and impact analysis. The one or more actionable items are employed to improve the overall process efficiency of SDLC.

In an embodiment, the actionable items derivation module 218 provides software delivery personas with insights that can include, but are not limited to, making informed decisions for efficient sprint planning, analyzing change impact for better coverage, identifying defect hot spots, and enhancing code quality, analyzing code change impact and optimizing testing efforts, correlating historical defects for faster resolution, and effective sprint planning based on dependencies and developer productivity insights.

In an exemplary embodiment, the actionable items derivation module 218 provides software product owners insights on, change impact analysis for new change request to existing requirements and new requirements by providing the correlation within the user stories and across test scenarios, test cases, and defects. In an exemplary implementation of the invention, this may reduce the time required for impact analysis by 15-20% as compared to the existing methods.

For instance, a product manager may want discussions related to insurance claims progress and real-time update (a new change request) translated to text from audio and summarized so that the product manager can document the change request details more efficiently for further action. For this purpose, the extraction module 214 may be configured to use any pre-trained model for speech recognition to build its own model. Using the speech recognition model, a meeting discussion may be translated to text, and then using text summarization, a change request summary is built efficiently.

In another instance, the product manager may want the SDLC knowledge fabric 110 to provide relevant search across organizational requirements, and repositories pertaining to a new change request, to analyze the various functionalities impacted due to the change request quickly and comprehensively. In this case, the NLP-based search engine built on a transformers-based architecture may be utilized.

In yet another exemplary embodiment, the actionable items derivation module 218 provides insights to software product owners on identified defects related to hotspots so as to provide a path for enhancing code quality. Identified the defects can be defects related to high proportion of executed instructions in a program, or where most time is spent during the program's execution.

The transformer-based architecture is basically a neural network architecture that consists of a multi-head self-attention mechanism combined with an encoder-decoder structure. The transformer-based architecture can achieve SOTA NPL results that outperform various other models leveraging recurrent (RNN) or convolutional neural networks (CNN) both in terms of evaluation score (GLEU score) and training time.

A key advantage of leveraging NLP-based search engine built on a transformers-based architecture over other neural network (NN) structures is that a longer-distanced context around a word is considered a more computationally efficient way. The self-attention mechanism of this architecture is identified to be much faster than recurrent layers for shorter sequence lengths and can be restricted to consider only a neighborhood in the input sequence for very long sequence lengths. In addition, the NLP search engine is advantageous over that it enables parallelization techniques that suit Graphics Processing Unit (GPU) computing.

In an implementation, the SDLC knowledge fabric 110 and graph embeddings may be leveraged to tease out the requirements, user stories, and test cases that most closely match a change request at hand. The Product Manager may search for claims status and real-time updates across the SDLC work artifacts and obtain near searches in requirements, test cases, defects, code files (comments), and other artifacts in order of matching. This enables the Product Manager to quickly go through these matching artifacts not just within an application portfolio, but also within wider organizational documents.

In accordance with an embodiment, the extraction module 214 may be configured to capture check-ins and check-outs in version control systems to identify details of software code developed. The transformation module 216 is configured to refine, using NLP correlations and the SDLC knowledge fabric 110, lines-of-code (LOC) productivity with quality in terms of defects associated with the software code. The actionable items derivation module 218 is configured to provide a nuanced analysis of the productivity of the software code developed in terms of function points and technical debt to introduce a new change request.

In an exemplary embodiment, the actionable items derivation module 218 provides an analysis of the productivity of the software developer in terms of LOC/day, functional points and technical debt. For this purpose, check-in and check-outs in version control systems are captured to provide details of the code developed by each software engineer. Further, NLP correlations, as well as the SDLC knowledge fabric 110 may be used to refine LOC productivity with quality in terms of defects associated with the code. Further, the SDLC knowledge fabric 110 leverages third-party semantic analysis software to get a more nuanced analysis of the productivity of the code developed in terms of function points and technical debt.

Thus, the invention provides holistic productivity measures for various software developers across various pods in a team. In an exemplary implementation of the invention, a product owner can look at the inventory of technology skill sets available at the disposal within a delivery unit and can plan for the sprint for the pod for the upcoming claims status feature.

In accordance with another embodiment, the extraction module 214 may be configured to identify, using the SDLC knowledge fabric 110 and graph embeddings data on past releases and dependencies between user stories. The transformation module 216 is configured to combine the data and the dependencies identified with software developer productivity. The actionable items derivation module 218 is configured to provide inputs on one or more productivity metrics related to change impact analysis of one or more application components using one or more learning algorithms. The one or more application components can include, but are not limited to, screens, databases, share components and code modules.

In an instance, a product owner may want the SDLC knowledge fabric 110 to provide ballpark estimates of the cost impact due to the new change request. For this purpose, the SDLC knowledge fabric 108 analyzes data on past releases, and dependencies between user stories and combines it with software developer productivity. By utilizing ML algorithms such as, for example, regression analysis, the actionable items derivation module 218 provides inputs on the efforts and sprints required to the product owner. The product owner can then take these as the basis for further refinement with application leads and architects, enabling to reduce the Turn-Around-Time (TAT) for change impact analysis.

With the availability of productivity metrics of various software developers within the specific Line-of-Business (LOB), the product owner can claim real-time status updates and can plan to set up the right pod, understand the dependencies, uncover risks while planning for the feature delivery for the upcoming program increment (PI).

In another exemplary embodiment, the actionable items derivation module 218 provides test managers with insights on the defect to test cases to user stories correlation allowing them to make predictions of defects for the next release based on the defect density and the impacted user stories. In an exemplary implementation of the invention, this may reduce the time required for defect resolution by 25-30% as compared to the existing methods.

In an instance, a Test Manager may want the SDLC knowledge fabric 110 to enable prioritizing and optimizing test cases for a new change request, to reduce regression testing time and efforts. For this purpose, test case prioritization techniques are used such as regression testing which is conducted on an executed test suite. Techniques of selecting only a subset of all possible test cases which is required based on one or more coverage criteria. Among the test case techniques, those which have both efficiency and effectiveness to reduce errors, are selected.

In accordance with yet another embodiment, the extraction module 214 is configured to identify using the SDLC knowledge fabric 110, time-series data from one or more application performance management tools. The transformation module 216 is configured to combine the time-series data with Chaos engineering. The extraction module 214 is configured to highlight performance issues and bottlenecks in one or more infrastructure resources during the SDLC. The one or more infrastructure resources may include, but are not limited to CPU utilization, memory usage, network latency, and input/output (I/O) constraints.

In accordance with still yet another embodiment, the actionable items derivation module 218 is configured to automatically generate, using the SDLC knowledge fabric 110 and by a fine-tuned transformers model, code, code comments, and code defect prediction.

In an instance, a software developer may want to obtain auto code suggestion or code generation, code defect detection, or code translation. For this purpose, the SDLC knowledge fabric 110 that is based on finetuned transformers model generates code, code translation, and code defect prediction. Though the code generation may not be a ready-to-use code, this automated code generation significantly reduces the coding efforts, allowing the software developer to focus on critical functionality development.

Figure 3:
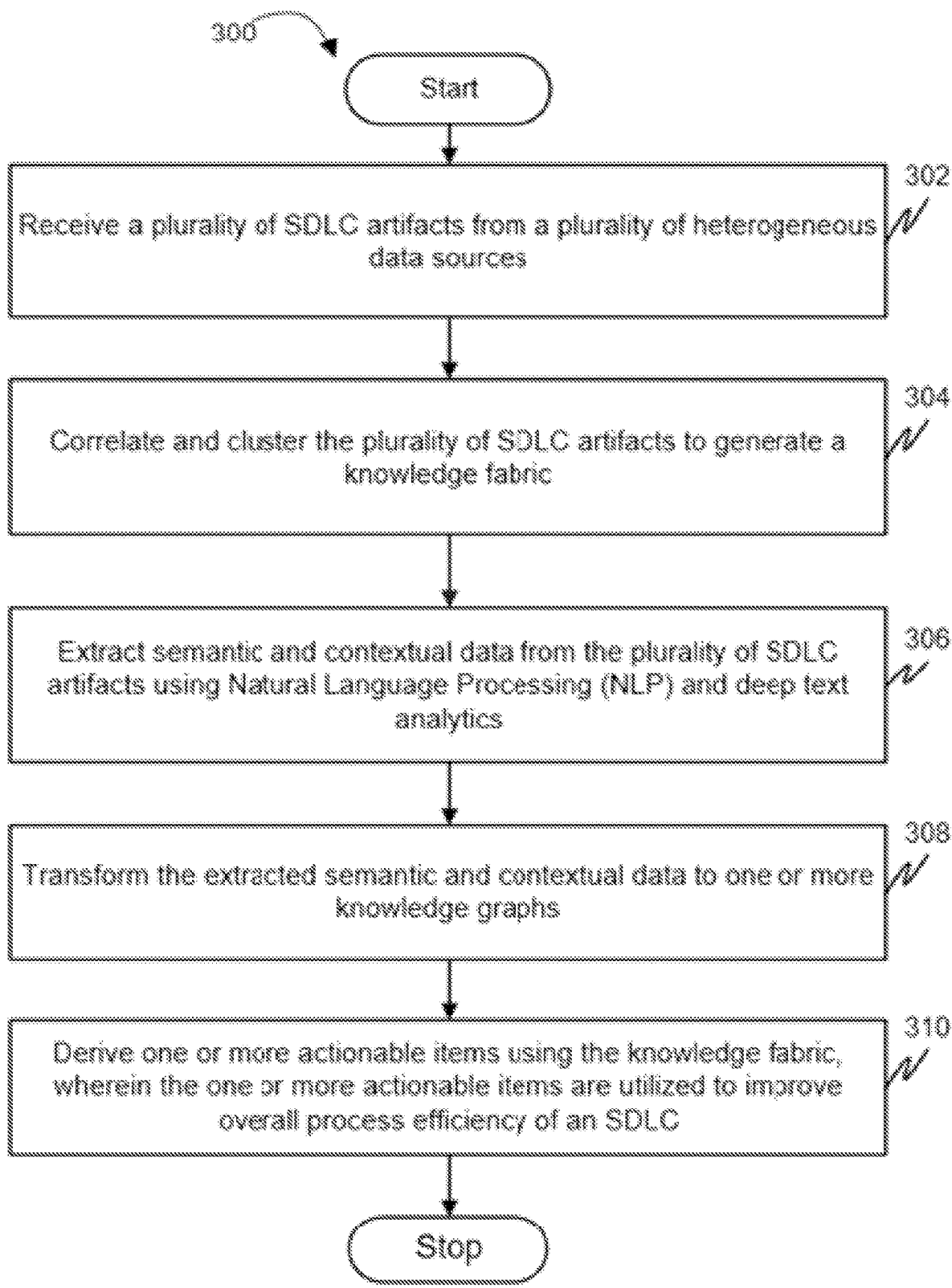
FIG. 3 illustrates a flowchart of a method building and utilizing an SDLC knowledge fabric in accordance with an embodiment of the invention.

FIG. 3 is a flowchart of a method for building and utilizing an SDLC knowledge fabric in accordance with an exemplary embodiment of the invention. Referring to FIG. 3, there is shown a flowchart of a method 300 for building and utilizing the SDLC knowledge fabric 110.

As illustrated in FIG. 3, at step 302, receive a plurality of SDLC artifacts from a plurality of heterogeneous data sources. The integration module 208 of the SDLC knowledge fabric building and utilization system 108 is configured to receive the plurality of SDLC artifacts from the plurality of heterogeneous data sources 102 that may include, but are not limited to, structured databases, semi-structured documents, and unstructured documents. The plurality of SDLC artifacts may include, but are not limited to, requirements, time-series data, user stories, test cases, code files (comments), databases, defect logs and other logs.

At step 304, correlate and cluster the plurality of SDLC artifacts to generate a knowledge fabric. The correlation module and cluster module 110 is configured to correlates and cluster the plurality of SDLC artifacts to generate the SDLC knowledge fabric 110 using the knowledge fabric generation module 212. The process at 304 is further explained in 306 and 308.

At step 306, extract semantic and contextual data from the plurality of SDLC artifacts using NLP and deep text analytics. The extraction module 214 is configured to extract the semantic and contextual data from the plurality of SDLC artifacts.

At step 308, transform the extracted semantic and contextual data to one or more knowledge graphs. The transformation module 216 is configured to transform the extracted semantic and contextual data to one or more knowledge graphs for knowledge organization systems or ontology.

Further, at step 310, derive one or more actionable items using the knowledge fabric, wherein the one or more actionable items are utilized to improve the overall process efficiency of an SDLC. The actionable items derivation module 218 is configured to derive one or more actionable items using the SDLC knowledge fabric 110. The one or more actionable items may include, but are not limited to, contextual search results based on one or more queries, AI-derived actionable insights, situational intelligence data, root cause analysis (RCA) and impact analysis.

Figure 4:
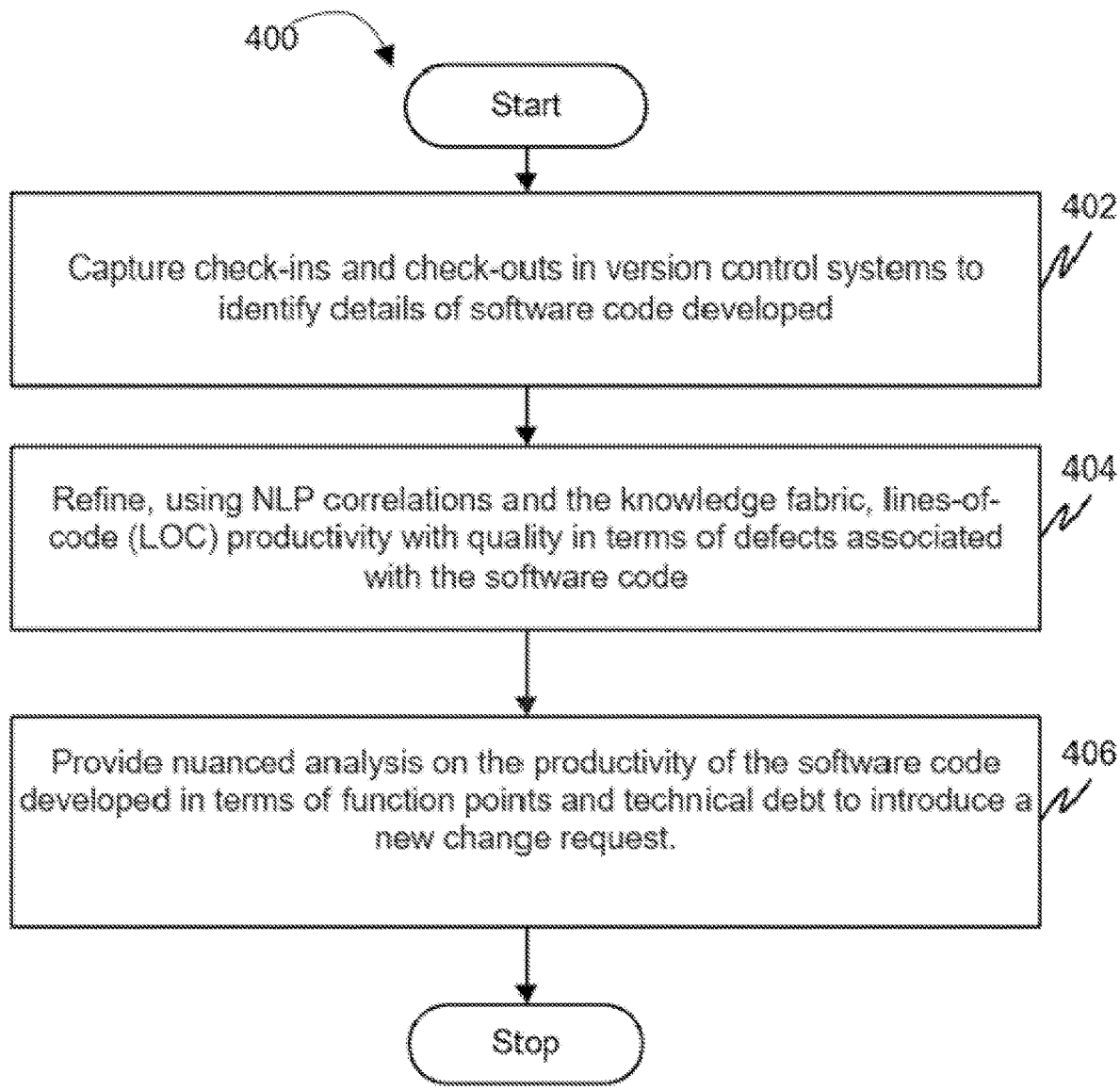
FIG. 4 illustrates another method for building and utilizing an SDLC knowledge fabric in accordance with an embodiment of the invention.

FIG. 4 is a flowchart that illustrates another method for building and utilizing an SDLC knowledge fabric in accordance with an exemplary embodiment of the invention. Referring to FIG. 4, there is shown a flowchart of a method 400 for building and utilizing the SDLC knowledge fabric 110.

At 402, capture check-ins and check-outs in version control systems to identify details of software code developed. The extraction module 214 may be configured to capture check-ins and check-outs in version control systems to identify details of software code developed.

At 404, refine, using NLP correlations and the knowledge fabric, lines-of-code (LOC) productivity with quality in terms of defects associated with the software code. The transformation module 216 is configured to refine, using NLP correlations and the SDLC knowledge fabric 110, LOC productivity with quality in terms of defects associated with the software code.

At 406, provide nuanced analysis on the productivity of the software code developed in terms of function points and technical debt to introduce a new change request. The actionable items derivation module 218 is configured to provide a nuanced analysis of the productivity of the software code developed in terms of function points and technical debt to introduce a new change request.

Figure 5:
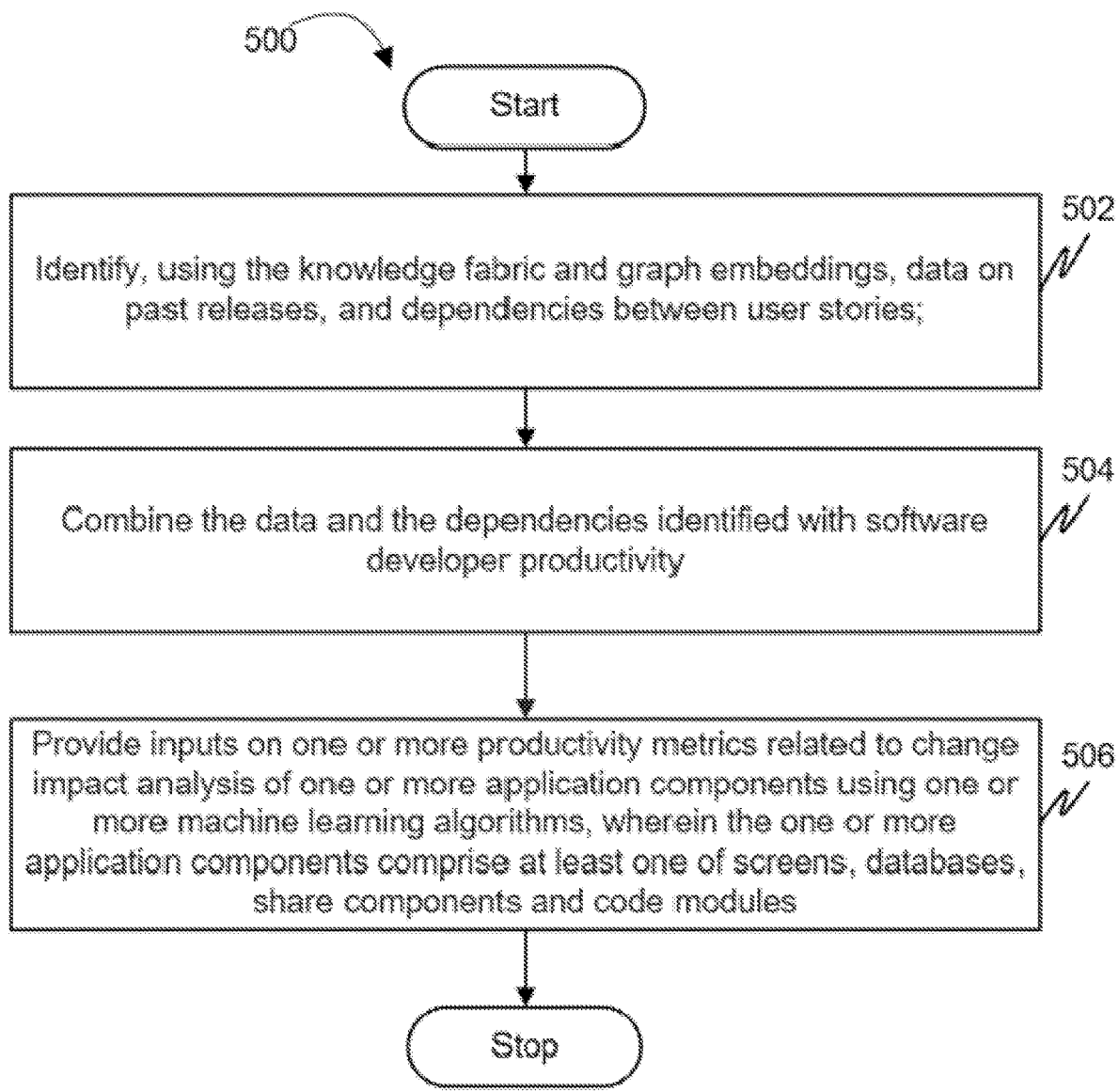
FIG. 5 illustrates yet another method for building and utilizing an SDLC knowledge fabric in accordance with an embodiment of the invention.

FIG. 5 is a flowchart that illustrates yet another method for building and utilizing an SDLC knowledge fabric in accordance with an exemplary embodiment of the invention. Referring to FIG. 5, there is shown a flowchart of a method 500 for building and utilizing the SDLC knowledge fabric 110.

At 502, identify, using the knowledge fabric and graph embeddings, data on past releases, and dependencies between user stories. The extraction module 214 may be configured to identify, using the SDLC knowledge graph 110 and graph embeddings, data on past releases, and dependencies between user stories.

At 504, combine the data and the dependencies identified with software developer productivity. The transformation module 216 may be configured to combine the data and the dependencies identified with software developer productivity, At 506, providing inputs on one or more productivity metrics related to change impact analysis of one or more application components using one or more machine learning algorithms, wherein the one or more application components comprise at least one of screens, databases, share components and code modules. The actionable items derivation module 218 provides inputs on one or more productivity metrics related to change impact analysis of one or more application components using one or more machine learning algorithms.

Figure 6:
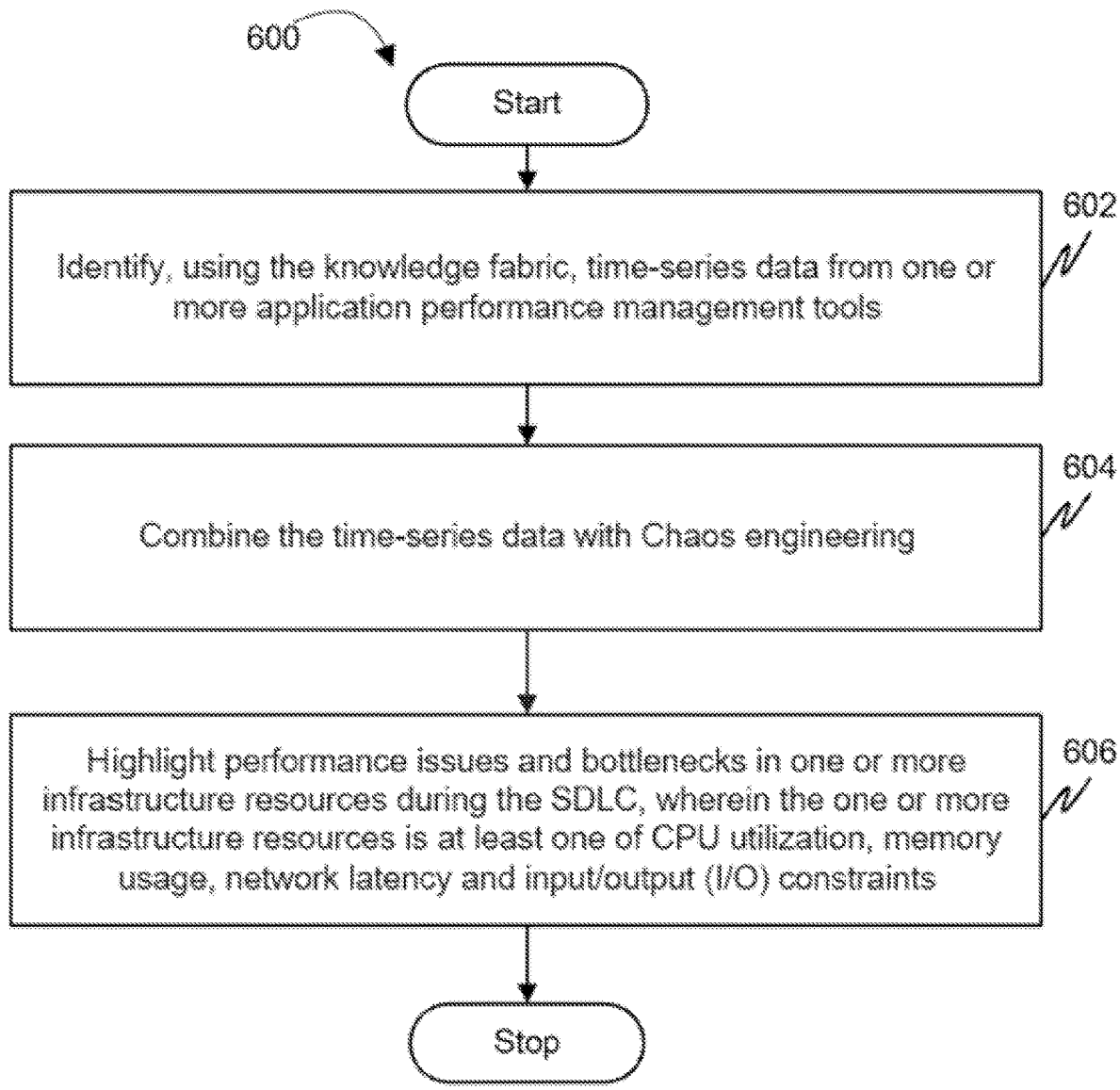
FIG. 6 illustrates yet another method for building and utilizing an SDLC knowledge fabric in accordance with an embodiment of the invention.

FIG. 6 is a flowchart that illustrates yet another method for building and utilizing an SDLC knowledge fabric in accordance with an exemplary embodiment of the invention. Referring to FIG. 6, there is shown a flowchart of a method 600 for building and utilizing the SDLC knowledge fabric 110.

At 602, identify, using the knowledge fabric, time-series data from one or more application performance management tools. The extraction module 214 may be configured to identify using the SDLC knowledge fabric 110, time-series data from one or more application performance management tools.

At 604, combine the time-series data with Chaos engineering. The transformation module 216 combines the time-series data with Chaos engineering.

At 606, highlight performance issues and bottlenecks in one or more infrastructure resources during the SDLC, wherein the one or more infrastructure resources is at least one of CPU utilization, memory usage, network latency, and input/output (I/O) constraints. The actionable items derivation module 218 may be configured to highlight performance issues and bottlenecks in one or more infrastructure resources during the SDLC.

The present invention is advantageous in that the confluence of multiple technologies enables the building of semantically and contextually rich knowledge graphs for a relevant search, inferences, and analysis, that may include step innovations in NLP such as Embeddings and Transformer Models, Graph databases growing in clout and maturity such as Knowledge Graphs and Remote working and DevOps tooling leading to exponential data.

These technologies enable a new paradigm of semantic knowledge graphs and AI (NLP)-assisted software delivery which in turn provides for accelerated, high productivity and delivering superior quality in SDLC. The finding of correlation in diverse data leans on knowledge graphs, data fabric, NLP, explainable AI, richer context of ML and AI. Active metadata utilizes cataloging, semantics and Knowledge Organization Systems (KOS) in taxonomies and ontology. The semantic knowledge graph provides an overarching umbrella for all types of data, further harmonizing different data, metadata schemata and different vocabularies.

Furthermore, the knowledge fabric delivers semantic, contextual and highly connected data allowing for highly relevant searches, while considering software delivery in the presence of highly connected data across heterogenous data structures (structured—databases, semi structured—XML, CSV files, unstructured—requirements documents).

Those skilled in the art will realize that the above recognized advantages and other advantages described herein are merely exemplary and are not meant to be a complete rendering of all of the advantages of the various embodiments of the present invention.

The invention claimed is:

1. A computer-implemented method, comprising:
constructing, by one or more processors, an NLP-based search engine on a transformers-based architecture to handle sequential data, wherein
the transformers-based architecture comprises a multi-head self-attention mechanism combined with an encoder-decoder structure that considers longer-distanced context around a word and enables parallelization techniques for Graphics Processing Unit (GPU) computing, and
the sequential data comprises at least one of natural language or tasks including translation or text summarization;
receiving, by the one or more processors, a plurality of Software Development Life Cycle (SDLC) artifacts of an SDLC from a plurality of heterogeneous data sources, wherein
the plurality of heterogeneous data sources comprises unstructured documents including word and pdf files, semi-structured documents including JSON and XML files, and structured databases including relational databases and
the plurality of SDLC artifacts comprises at least requirements, test cases, and defect logs;
correlating and clustering, by the one or more processors, the plurality of SDLC artifacts to generate a knowledge fabric, wherein the correlating and clustering comprises:
extracting, by the one or more processors, semantic and contextual data from the plurality of SDLC artifacts based on Natural Language Processing (NLP) and deep text analytics, wherein
the extracting comprises named entity extraction and information extraction for use in building knowledge organization systems or ontologies, and
the NLP includes using the NLP-based search engine on the transformers-based architecture; and
transforming, by the one or more processors, the extracted semantic and contextual data to one or more knowledge graphs to build the knowledge organization systems or the ontologies, wherein the one or more knowledge graphs comprise Resource Description Framework (RDF) triples, semantic web graphs, or labeled property graphs that are queryable by graph query languages;
deriving, by the one or more processors, one or more actionable items based on the knowledge fabric, wherein the one or more actionable items include change impact analysis for new change requests to the requirements, defect hotspot identification, root cause analysis, and contextual search results utilized to improve overall process efficiency of the SDLC;

automatically generating a defect prediction based on the knowledge fabric;
processing data that identifies a file impacted by a new requirement or a defect;
identifying a correction to the defect;
identifying, based on the knowledge fabric, time-series data from one or more application performance management tools;
combining the time-series data with Chaos engineering; and
highlighting performance issues and bottlenecks in one or more infrastructure resources during the SDLC, wherein the one or more infrastructure resources is at least one of CPU utilization, memory usage, network latency, or input/output (I/O) constraints.

2. The computer-implemented method as claimed in claim 1, wherein the plurality of SDLC artifacts further comprises at least one of time-series data, user stories, code files, or databases.

3. The computer-implemented method as claimed in claim 1, wherein the extracting further comprises:
translating, based on a speech recognition model, audio corresponding to at least one SDLC artifact of the plurality of SDLC artifacts to text; and
creating, based on summarization of the text, a change request summary, wherein the speech recognition model is at least one of a pretrained fine-tuned transformers-based model Wav2Vec2 or a trained DeepSpeech model.

4. The computer-implemented method as claimed in claim 1, wherein the one or more actionable items further comprise at least one of the contextual search results based on one or more queries, AI-derived actionable insights, or situational intelligence data.

5. The computer-implemented method as claimed in claim 1, further comprising:
capturing, by the one or more processors, check-ins and check-outs in version control systems to identify details of software code;
refining, based on NLP correlations and the knowledge fabric, lines-of-code (LOC) productivity with quality in terms of defects associated with the software code; and
providing nuanced analysis, on the productivity of the software code, in terms of function points and technical debt to introduce a new change request.

6. The computer-implemented method as claimed in claim 1, further comprising:
identifying, based on the knowledge fabric and graph embeddings, data on past releases, and dependencies between user stories, wherein the plurality of SDLC artifacts further comprises the user stories;
combining the data on the past releases and the dependencies between the user stories with software developer productivity; and
providing, based on the combining and one or more machine learning algorithms, inputs on one or more productivity metrics related to change impact analysis of one or more application components, wherein the one or more application components comprise at least one of screens, databases, share components, or code modules.

7. The computer-implemented method as claimed in claim 1, further comprising automatically generating, based on the knowledge fabric and a fine-tuned transformers model, at least one of code, or code translation, to reduce coding efforts of a software developer.

8. A system, comprising:
a memory;
a processor communicatively coupled to the memory, wherein the processor is configured to:
construct an NLP-based search engine on a transformers-based architecture to handle sequential data, wherein
the transformers-based architecture comprises a multi-head self-attention mechanism combined with an encoder-decoder structure that considers longer-distanced context around a word and enables parallelization techniques for Graphics Processing Unit (GPU) computing, and
the sequential data comprises at least one of natural language or tasks including translation or text summarization;
receive a plurality of Software Development Life Cycle (SDLC) artifacts of an SDLC from a plurality of heterogeneous data sources, wherein
the plurality of heterogeneous data sources comprises unstructured documents including word and pdf files, semi-structured documents including JSON and XML files, and structured databases including relational databases, and
the plurality of SDLC artifacts comprises at least requirements, test cases, and defect logs;
correlate and cluster the plurality of SDLC artifacts to generate a knowledge fabric;
extract semantic and contextual data from the plurality of SDLC artifacts based on Natural Language Processing (NLP) and deep text analytics, wherein
the extraction comprises named entity extraction and information extraction to for use in a building process of knowledge organization systems or ontologies, and
the NLP includes utilization of the NLP-based search engine on the transformers-based architecture; and
transform the extracted semantic and contextual data to one or more knowledge graphs to build the knowledge organization systems or the ontologies, wherein the one or more knowledge graphs comprise Resource Description Framework (RDF) triples, semantic web graphs, or labeled property graphs that are queryable by graph query languages;
derive one or more actionable items based on the knowledge fabric, wherein the one or more actionable items include change impact analysis for new change requests to the requirements, defect hotspot identification, root cause analysis, and contextual search results utilized to improve overall process efficiency of the SDLC;
automatically generate a defect prediction based on the knowledge fabric;
process data that identifies a file impacted by a new requirement or a defect;
identify a correction to the defect;
identify, based on the knowledge fabric, time-series data from one or more application performance management tools;
combine the time-series data with Chaos engineering; and
highlight performance issues and bottlenecks in one or more infrastructure resources during the SDLC, wherein the one or more infrastructure resources is at least one of CPU utilization, memory usage, network latency, or input/output (I/O) constraints.

9. The system as claimed in claim 8, wherein the plurality of SDLC artifacts further comprises at least one of time-series data, user stories, code files, or databases.

10. The system as claimed in claim 8, wherein the processor is further configured to:
    translate, based on a speech recognition model, audio corresponding to at least one SDLC artifact of the plurality of SDLC artifacts to text; and
    create, based on summarization of the text, a change request summary, wherein the speech recognition model is at least one of a pretrained fine-tuned transformers-based model Wav2Vec2 or a trained Deep-Speech model.

11. The system as claimed in claim 8, wherein the one or more actionable items further comprise at least one of the contextual search results based on one or more queries, AI-derived actionable insights, or situational intelligence data.

12. The system as claimed in claim 8, wherein the processor is further configured to:
    capture check-ins and check-outs in version control systems to identify details of software code;
    refine, based on NLP correlations and the knowledge fabric, lines-of-code (LOC) productivity with quality in terms of defects associated with the software code; and
    provide nuanced analysis, on the productivity of the software code, in terms of function points and technical debt to introduce a new change request.

13. The system as claimed in claim 8, wherein the processor is further configured to:
    identify, based on the knowledge fabric and graph embeddings, data on past releases, and dependencies between user stories, wherein the plurality of SDLC artifacts further comprises the user stories;
    combine the data on the past releases and the dependencies between the user stories with software developer productivity; and
    provide, based on the combination and one or more machine learning algorithms, inputs on one or more productivity metrics related to change impact analysis of one or more application components, wherein the one or more application components comprise at least one of screens, databases, share components, or code modules.

14. The system as claimed in claim 8, wherein the processor is further configured to automatically generate, based on the knowledge fabric and a fine-tuned transformers model, at least one of code, or code translation, to reduce coding efforts of a software developer.

* * * * *